United States Patent
Martin et al.

[19]

[11] Patent Number: 6,045,028
[45] Date of Patent: Apr. 4, 2000

[54] INTEGRAL CORROSION PROTECTION OF FRICTION-WELDED JOINTS

[75] Inventors: Ricky Lynn Martin, St. Peters; David Robert Bolser, Florissant, both of Mo.

[73] Assignee: McDonnell Douglas Corporation, St. Louis, Mo.

[21] Appl. No.: 09/118,655

[22] Filed: Jul. 17, 1998

[51] Int. Cl.[7] .................................................. B23K 20/12
[52] U.S. Cl. ...................... 228/112.1; 228/189; 228/214; 228/262.5
[58] Field of Search ...................... 228/112.1, 114, 228/189, 244, 246, 247, 249, 250, 251, 214, 262.5

[56] References Cited

U.S. PATENT DOCUMENTS

| | | | |
|---|---|---|---|
| 2,074,987 | 3/1937 | Lagerblade | 228/251 |
| 2,249,723 | 7/1941 | Orr, Jr. . | |
| 3,227,849 | 1/1966 | Thielsch . | |
| 3,463,901 | 8/1969 | Lamonde et al. . | |
| 3,639,724 | 2/1972 | Gerath . | |
| 4,032,057 | 6/1977 | Linscott, Jr. | 228/251 |
| 4,412,643 | 11/1983 | Sato et al. . | |
| 5,611,479 | 3/1997 | Rosen . | |
| 5,971,252 | 10/1999 | Rosen et al. | 228/112.1 |
| 5,975,406 | 11/1999 | Mahoney et al. | 228/112.1 |

FOREIGN PATENT DOCUMENTS

| | | | |
|---|---|---|---|
| 10193143 | 7/1998 | Japan | 228/112.1 |
| 11010368 | 1/1999 | Japan | 228/112.1 |

OTHER PUBLICATIONS

Metals Handbook Ninth Edition, vol. 6, "Weld Overlays", pp804–819, 1983.

*Primary Examiner*—Samuel M. Heinrich
*Attorney, Agent, or Firm*—Alston & Bird LLP

[57] ABSTRACT

A zone of corrosion-resistant material covering a friction stir welded joint surface is provided by applying a layer of corrosion-resistant material over one or both surfaces of the workpieces being joined so that the layer covers at least the weld zone which will be rendered plastic during a friction stir welding operation. The corrosion-resistant material layer is contacted by the friction stir welding tool, and the tool causes shearing and plastic flow of the corrosion-resistant material along the surface of the welded joint. The corrosion-resistant material thus metallurgically bonds with portions of the plasticized metal so as to form a corrosion-resistant zone protecting the welded joint from exposure to corrosive environments.

15 Claims, 5 Drawing Sheets

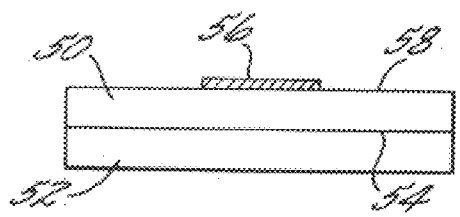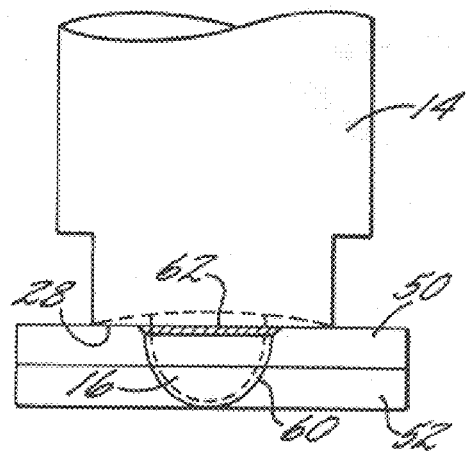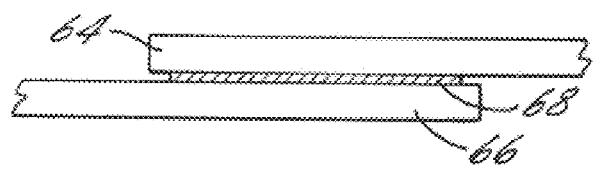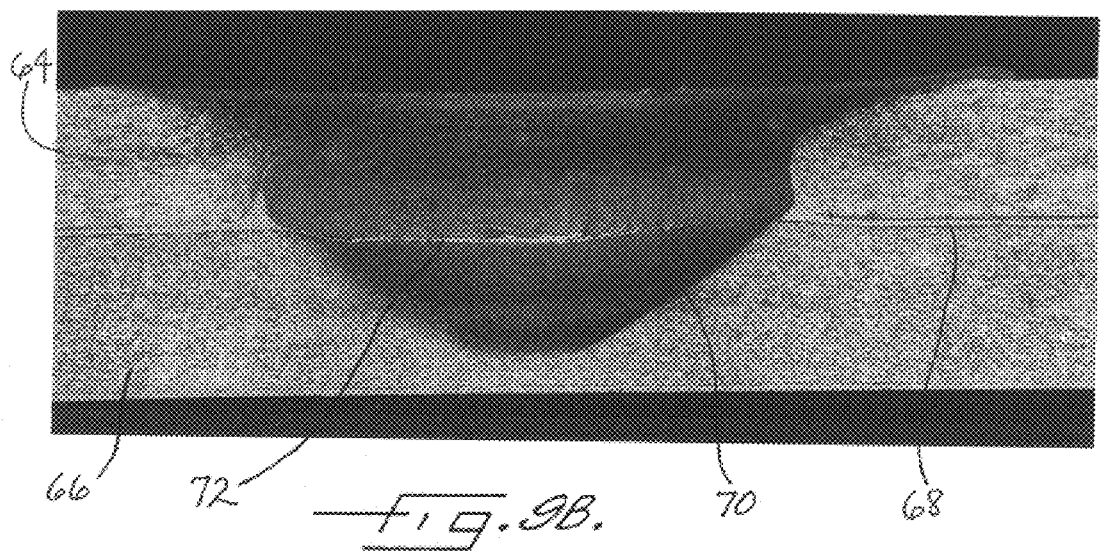

INTEGRAL CORROSION PROTECTION OF FRICTION-WELDED JOINTS

FIELD OF THE INVENTION

The present invention relates to welding of metals and, more particularly, to friction welding of joints between metal workpieces.

BACKGROUND OF THE INVENTION

Friction stir welding is a known technique for welding together workpieces across a joint therebetween. The process is described in U.S. Pat. No. 5,460,317, the disclosure of which is incorporated herein by reference, and generally comprises passing a rotating stir pin between the workpieces at the joint so that the stir pin frictionally heats and plasticizes the material of both workpieces surrounding the stir pin and causes the plastic material to mix, and advancing the rotating stir pin along the joint to metallurgically bond the workpieces together.

Friction stir welding has provided a practical process for welding certain materials which theretofore could not practically be welded to create structural assemblies. For example, precipitation-hardened high-strength aluminum alloys are attractive candidates for constructing high-performance structures having high strength-to-weight ratios, but prior to the development of the friction stir welding method their full advantage could not be realized in structures having linear welded joints because no process for effectively weld such materials along linear welds had been available. Consequently, mechanical fasteners had to be used for joining components formed of high-strength aluminum alloys. The added weight of the fasteners compromises the weight-reducing benefits of these high-strength materials.

With the advent of the friction stir welding process, a method for effectively joining these high-strength aluminum alloys along linear joints without mechanical fasteners has been provided, thereby removing one of the barriers to more-widespread use of such materials for constructing high-performance structures. However, another barrier to their use still remains. Specifically, the carefully engineered, corrosion-resistant microstructure of high-strength precipitation-hardened aluminum alloys tends to become altered in the process of being welded, such that the weld zone is prone to corrosive degradation at an accelerated rate compared to the material outside the weld zone. The result is welded joints having poor corrosion resistance. Although welded structures are typically chemically treated to enhance their corrosion resistance prior to being placed into service, this type of treatment would be inadequate to overcome the poor corrosion resistance of the welded joints.

Thus, prior to the present invention there has not been available a technique for effectively welding high-strength aluminum alloys and the like while preserving adequate corrosion resistance at the welded joints.

SUMMARY OF THE INVENTION

The present invention overcomes the problems associated with welding materials such as high-strength precipitation-hardened aluminum alloys as noted above, by providing a process for friction stir welding in which an integral corrosion-resistant material zone is created at a weld zone surface, which would otherwise be exposed to potentially corrosive environments, concurrently with the formation of the weld. The corrosion-resistant material zone is intimately and metallurgically bonded to the material of the workpieces being joined, covering the surface of the weld zone so that the material in the weld zone is protected against exposure to corrosive agents.

More particularly, a preferred embodiment of the method of the invention comprises defining a weld zone of the workpieces which is to be rendered plastic for creating a metallurgical bond between two workpieces which are connected at a joint therebetween. A layer of corrosion-resistant material is affixed to the outer surface of the weld zone adjacent outer surfaces of one or both of the workpieces. The corrosion-resistant material may be applied as a strip covering the weld zone and extending along the joint. In accordance with one preferred embodiment of the invention, the corrosion-resistant material strip is a metal strip. The metal strip may be affixed by tack welding or other suitable technique. Alternatively, in the case of butt welds, the corrosion-resistant metal may be applied as a discrete layer covering the outer surface of each workpiece such that the discrete layers together form a substantially continuous layer of corrosion-resistant material when the workpieces are placed in edge-abutting relation. The discrete layers may be applied by a cladding process or other suitable technique.

In the case of welding across a lap joint between two overlapping workpieces, the corrosion-resistant material layer is applied over the outer surface of one of the workpieces which will constitute the outer surface of the welded joint.

With the workpieces positioned in contact with each other, a friction stir welding operation is performed to plastice the metal of the workpieces within the weld zone as well as shear the corrosion-resistant material layer or layers to cause plastic flow thereof along the outer surface of the weld zone. The corrosion-resistant material intimately and metallurgically bonds to the outer surface of the welded joint.

The friction stir welding operation is performed by engaging both workpieces on either side of the joint with a stir pin of a rotating friction stir welding tool so as to cause local plasticization of the metal of both workpieces adjacent the joint, and advancing the rotating friction stir welding tool along the joint to create the friction stir welded joint. The friction stir welding tool includes a shoulder which contacts the outer surfaces of the workpieces during the welding operation and applies a force to the workpieces. The shoulder engages the corrosion-resistant material layer or layers and causes frictional heating and shearing thereof. As the rotating friction stir welding tool is advanced in the plane of the workpieces to form a weld, the shoulder causes planar plastic flow of the corrosion-resistant material along the boundary with the plasticized metal of the workpieces and causes the corrosion-resistant material to be intimately and metallurgically bonded to the outer surface of the weld zone.

Thus, the corrosion-resistant material layer forms an integral corrosion-resistant zone spanning the joint and covering the metal in the weld zone which has been metallurgically altered by the thermal excursion during the welding operation. The weld zone is thereby protected against exposure to corrosive environments.

In accordance with a further method of the invention for forming welded lap joints, a layer of corrosion-resistant material is interposed between overlapping portions of two workpieces and a friction stir welding operation is performed to form a lap weld through the overlapping portions. The rotating stir pin causes plastic flow of the corrosion-resistant material layer surrounding the weld zone, causing the corrosion-resistant material to metallurgically bond with the plasticized metal of the workpieces. The result is a corrosion-resistant material surrounding and metallurgically bonded to the weld at the lap joint, thus sealing the joint and preventing corrosive agents from contacting and causing corrosion of the weld.

The invention also provides a welded joint for joining two metal workpieces. The welded joint comprises first and second workpieces connected at a joint therebetween and metallurgically bonded to each other by a welded zone extending across the joint. The welded joint also includes a corrosion-resistant material intimately and metallurgically bonded to the metal in the welded zone to thereby form a zone of corrosion-resistant material along a surface of the welded zone.

In accordance with a preferred embodiment of the invention, the workpieces are formed of precipitation-hardened aluminum alloy, and the corrosion-resistant material is pure aluminum. However, the invention is applicable to welding a variety of materials. In addition to high-strength aluminum alloys, the invention may be applied for welding titanium, steel, copper, and other materials. The corrosion-resistant material is selected to be compatible with the material being welded.

By intimately and metallurgically bonding with portions of the first and second workpieces within the weld zone, the corrosion-resistant material protects the metal in the weld zone which has been metallurgically altered during the welding operation and is otherwise susceptible to corrosion.

BRIEF DESCRIPTION OF THE DRAWINGS

The above and other objects, features, and advantages of the invention will be made more apparent from the following description of certain preferred embodiments thereof, when taken in conjunction with the accompanying drawings in which:

FIG. 8A is a cross-sectional view taken on line 8A—8A of FIG. 7, showing the lap joint prior to welding;

FIG. 8B is a cross-sectional view taken on line 8B—8B of FIG. 7, showing the lap joint after welding;

FIG. 9A is a cross-sectional view similar to FIG. 8A, showing a lap joint in which a layer of corrosion-resistant material is introduced between the overlapping workpieces prior to welding; and FIG. 9B is a photomicrograph of a lap joint weld produced by lap welding the lap joint of FIG. 9A, taken along a plane normal to the direction in which the friction stir welding tool is advanced.

DETAILED DESCRIPTION OF THE DRAWINGS

The invention will now be explained by reference to certain preferred embodiments thereof. However, it is to be understood that the invention is not limited to these particular embodiments.

Figure 1:
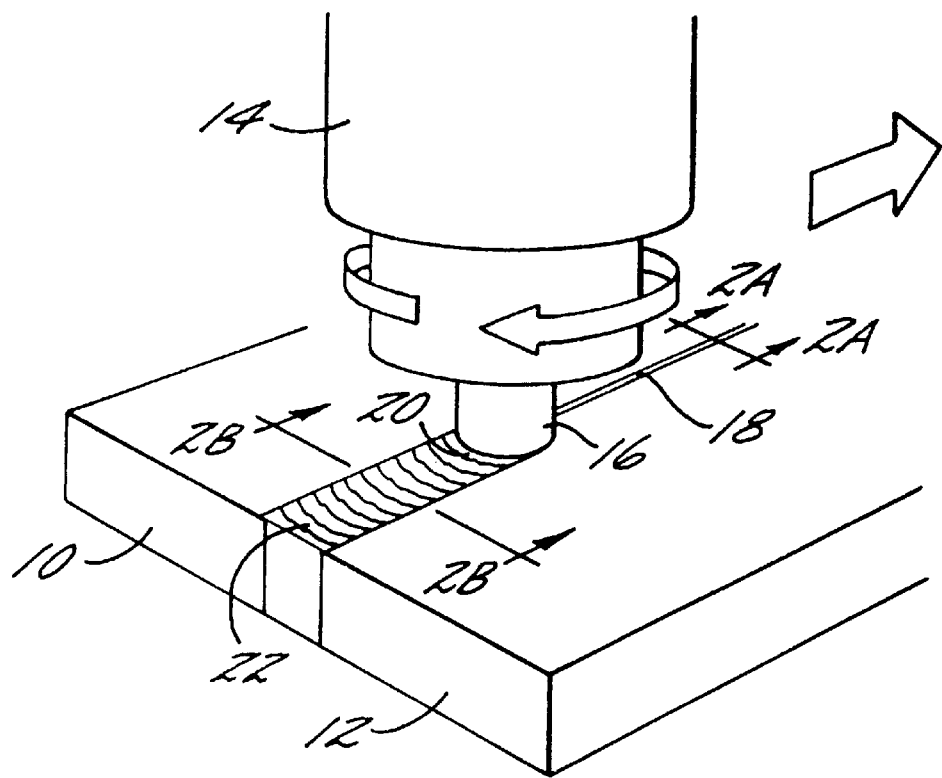
FIG. 1 is a schematic perspective view showing a conventional friction stir welding operation for forming a butt weld between two workpieces.
Figure 2A:
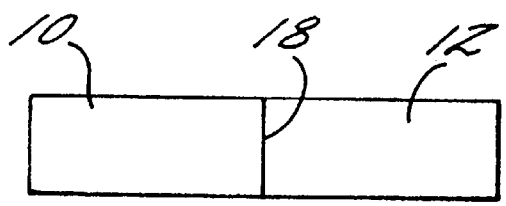
FIG. 2A is a cross-sectional view taken on line 2A—2A of FIG. 1 showing the butt joint prior to welding.
Figure 2B:
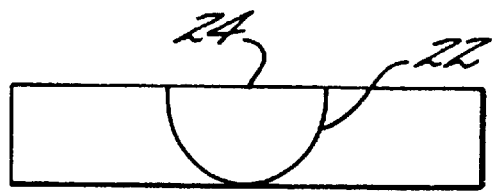
FIG. 2B is a cross-sectional view taken on line 2B—2B of FIG. 1 showing the butt joint after welding.

FIG. 1 depicts a conventional friction stir butt welding operation as described in the aforementioned U.S. Pat. No. 5,460,317 which has been incorporated herein by reference. The two workpieces 10 and 12 which are to be butt welded are placed in edge-abutting relation, as best seen in FIG. 2A. A rotating friction stir welding tool 14 having a stir pin 16 is brought into engagement with upper surfaces of the workpieces such that the stir pin 16 contacts the material of both workpieces on either side of the joint 18 therebetween. The rotating stir pin 16 frictionally heats the material of the workpieces adjacent the stir pin 16 and causes the material to plasticize, enabling the stir pin 16 to be plunged into the workpieces until the plastic zone extends to a location adjacent the lower surfaces of the workpieces. The rotating tool 14 is advanced along the joint 18, and the stir pin 16 heats and plasticizes the workpiece material as the tool advances, mixing the plasticized materials of the two workpieces together to create a plastic zone 20 which seamlessly and continuously bridges the workpieces. As shown in FIG. 2B, the plasticized material left in the wake of the advancing stir pin cools and resolidifies, thus forming a weld 22 between the workpieces.

The outer surface 24 of the welded zone 22 is left exposed to potentially corrosive environments. Where the corrosion resistance properties of the workpieces being welded are degraded by the thermal excursion experienced during the welding operation, which occurs for example with high-strength precipitation-hardened aluminum alloys, this exposed surface of the welded joint represents a serious disadvantage because corrosive attack on the welded joint will be allowed to occur, even in instances in which the welded structures are chemically treated before being placed in service.

Figure 3:
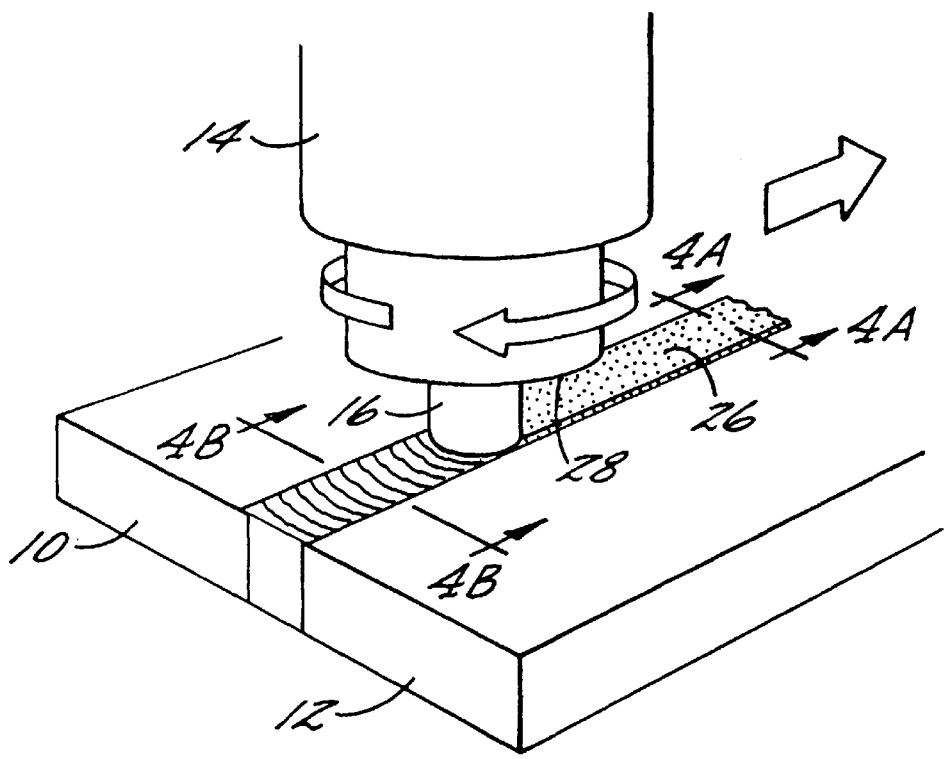
FIG. 3 is a schematic perspective view showing a friction stir welding operation in accordance with the invention, for forming a butt weld having an integral corrosion-resistant material zone covering the outer surface of the welded joint.

The invention provides a welding method and a welded joint which overcome this disadvantage. FIG. 3 depicts a welding operation for forming a friction stir welded butt weld in accordance with the present invention. The workpieces 10 and 12 are placed in edge-abutting relation, and the outer surface of the joint 18 (i.e., the surface adjacent the friction stir welding tool 14) is covered by a strip 26 of corrosion-resistant material. The strip 26 extends for a transverse width (measured transverse to the direction along which the friction stir welding tool 14 is advanced) that is sufficient to cover a weld zone which is predetermined or defined based on the diameter of the stir pin 16. The weld zone is the region of the workpieces 10 and 12 that will be rendered plastic by the frictional heating induced by the rotating stir pin 16 when the friction stir welding operation is performed. As previously described, the microstructure of the metal in this weld zone is subject to being altered by the thermal excursion experienced during friction stir welding such that the corrosion resistance of the metal is substantially degraded.

Figures 4A, 4B:
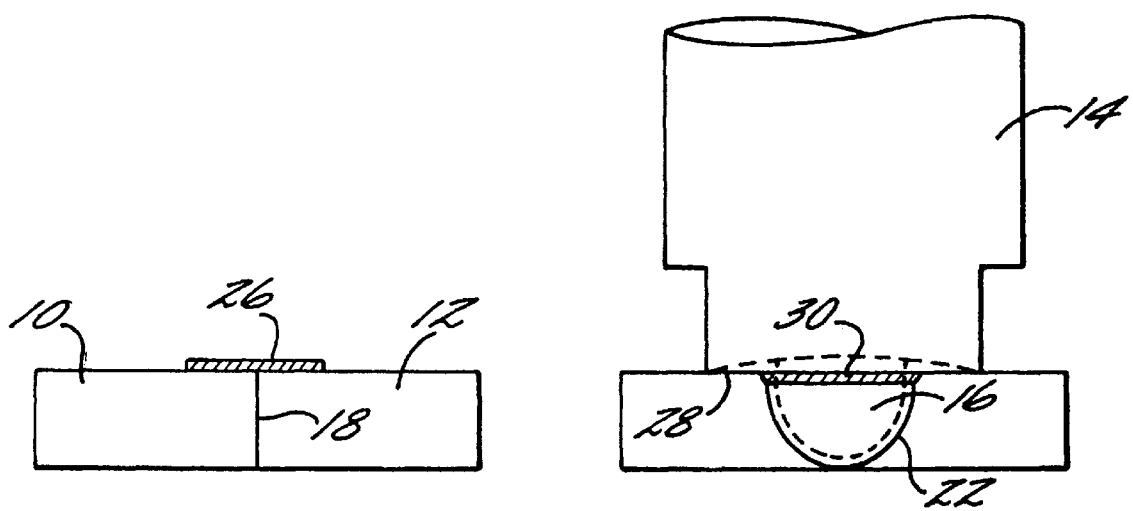
FIG. 4A is a cross-sectional view taken on line 4A—4A of FIG. 3 showing the butt joint prior to welding.
FIG. 4B is a cross-sectional view taken on line 4B—4B of FIG. 3 showing the butt joint after welding.

The strip 26 may be comprised of various corrosion-resistant materials, including metals and non-metals. For example, pure aluminum (i.e., aluminum which is not intentionally alloyed with any other material) may be used, as it has very good corrosion-resistant properties and is compatible with aluminum alloys. Alternatively, a sacrificial metal such as cadmium or magnesium may be used, so that corrosion of the sacrificial metal occurs while the underlying welded joint is protected against corrosion. Non-metal corrosion-resistant materials may include chromium oxide or the like. The invention is not limited to any particular corrosion-resistant material.

Where the corrosion-resistant material is a metal, it may be tack welded to the workpieces as shown in FIG. 4A. However, other methods of affixing the strip to the workpieces may be used.

As best seen in FIG. 4B, the friction stir welding tool 14 engages the workpieces such that a shoulder 28, from which the stir pin 16 extends, intimately contacts the corrosion-resistant strip 26 and frictionally engages the strip to cause a shearing action and plastic flow of the corrosion-resistant material along the outer surface of the joint. Metallurgical bonding of the corrosion-resistant material and the plasticized metal of the workpieces occurs along the boundary therebetween in the weld zone. Thus, the resulting welded joint includes a corrosion-resistant material zone 30 covering the surface of the weld zone which would otherwise be exposed to potentially corrosive agents. The corrosion-resistant material zone covers the weld zone 22 and is continuously bonded to the upper surfaces of the workpieces. The corrosion-resistant material zone 30 protects the metal of the weld zone 22 from exposure to corrosive environments.

Figure 5A:
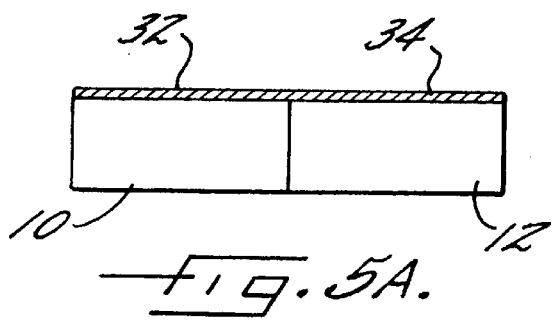
FIG. 5A is a view similar to FIG. 4A, showing an alternative method of affixing corrosion-resistant material to the workpieces.
Figure 5B:
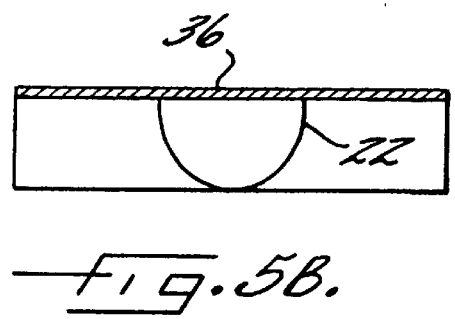
FIG. 5B is a view similar to FIG. 4B, showing the butt joint resulting from friction stir welding the joint of FIG. 5A.
Figure 6A:
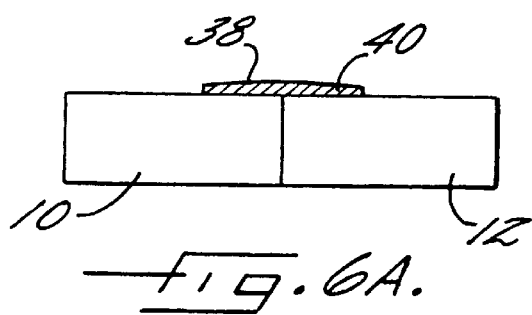
FIG. 6A is a view similar to FIGS. 4A and 5A, showing yet another method of affixing corrosion-resistant material to the workpieces.

Prior to welding, the layer of corrosion-resistant material may be applied to the workpieces by various techniques, one of which has been described in connection with FIG. 4A. FIGS. 5A and 6A depict other techniques for affixing corrosion-resistant material layers to the workpieces in preparation for welding. In FIG. 5A, each of the workpieces 10 and 12 is separately clad with a corrosion-resistant material layer 32 and 34, respectively. The workpieces are then placed in edge-abutting relation as shown in FIG. 5A so that the corrosion-resistant layers 32 and 34 together form a substantially continuous layer covering the upper surfaces of the workpieces, and the welding operation is then performed. FIG. 5B shows the friction stir welded butt weld formed from the structure of FIG. 5A. The shoulder of the friction stir welding tool shears the two cladding layers 32 and 34 and causes them to metallurgically bond with the metal in the weld zone 22 and to form a continuous corrosion-resistant material zone 36 covering the weld zone.

Figure 5C:
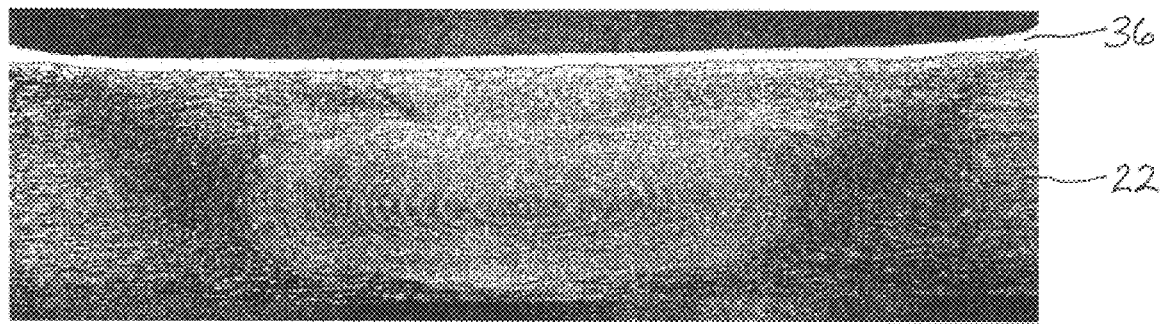
FIG. 5C is a photomicrograph of a butt weld produced in accordance with the invention by friction stir welding the butt joint of FIG. 5A, obtained by cutting the butt weld on a plane normal to the direction in which the friction stir welding tool is advanced, such as along the line 4B—4B of FIG. 3.

FIG. 5C is a photomicrograph of a butt weld produced in accordance with the invention, in which ¼-inch thick plates of 2024 aluminum alloy were friction stir butt welded by a process as depicted in FIG. 3. Each of the plates was clad prior to welding with a 0.012-inch thick sheet of Al-1Zn corrosion-resistant aluminum alloy on its upper surface, similar to the workpieces shown in FIG. 5A. The weld zone 22 is visible as the central region of discolored material. A continuous layer 36 of corrosion-resistant material covers the weld zone 22.

Figure 6B:
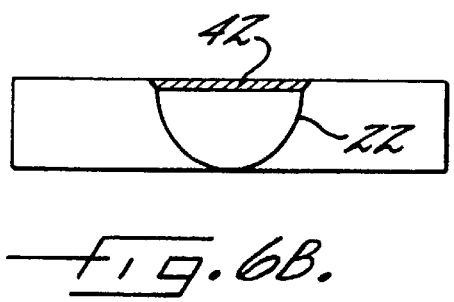
FIG. 6B is a view similar to FIGS. 4B and 5B, showing the butt joint resulting from friction stir welding the joint of FIG. 6A.

FIG. 6A depicts yet another method of preparing the workpieces for welding. Corrosion-resistant material layers 38 and 40 are deposited locally on the workpieces 10 and 12, respectively, so that the layers cover the predetermined weld zone of each workpiece. The workpieces are then abutted against each other, and the welding operation is performed. FIG. 6B depicts the welded joint formed from the structure of FIG. 6A. A corrosion-resistant material zone 42 covers the weld zone 22.

Figure 7:
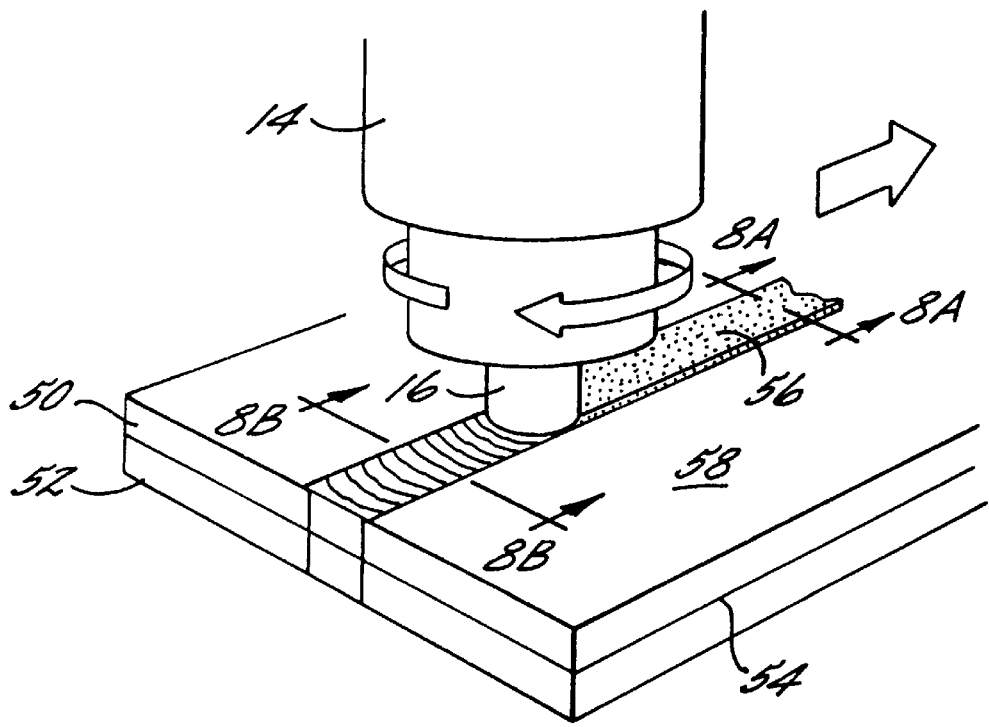
FIG. 7 is a schematic perspective view showing a friction stir welding operation for forming a welded joint across a lap joint between two overlapping workpieces in accordance with the invention.

The method of the invention is applicable to forming welded joints of other types in addition to butt welds. As an illustrative example, FIG. 7 schematically depicts a welding operation in accordance with the invention for welding together two workpieces at a lap joint. An upper workpiece 50 ("upper" denoting the workpiece adjacent the friction stir welding tool 14, it being understood that the welding operation need not be performed with the tool 14 in a vertical orientation as shown in the drawings) is positioned in overlapping relation with a lower workpiece 52 to define a lap joint 54 therebetween, as shown in FIGS. 7 and 8A. A strip 56 of corrosion-resistant material is affixed to the outer surface 58 of the upper workpiece 50 so that it covers a predetermined weld zone which will be rendered plastic during the welding operation. The friction stir welding operation is then performed, the rotating stir pin 16 extending completely through the thickness of the upper workpiece 50 and partially through the thickness of the lower workpiece 52 such that a welded zone 60 is created which extends from the outer surface 58 through the upper workpiece 50 and at least partially through the thickness of the lower workpiece 52, as shown in FIG. 8B. The corrosion-resistant strip 56 is sheared by the shoulder 28 of the tool 14 and metallurgically bonded to the outer surface of the weld zone 60 to form a corrosion-resistant zone 62 covering the outer surface of the joint.

A variation on the lap weld method described above is depicted in FIGS. 9A and 9B. Workpieces 64 and 66 are overlapped to define a lap joint therebetween. A layer 68 of corrosion-resistant material is interposed between the workpieces at the lap joint. A friction stir welding process is performed to form a lap joint weld in the region of the workpieces having the corrosion-resistant material layer 68. The rotating stir pin plasticizes the metal of the workpieces, and also causes plastic flow of the corrosion-resistant material layer 68 in the region of the weld. FIG. 9B shows a photomicrograph of a lap weld produced by this method. Two sheets of 0.063-inch thick 7075 aluminum alloy were overlapped, a cladding layer of non-alloyed aluminum was interposed between the sheets prior to welding, and a friction stir welding operation was performed. The weld zone 70 is visible as the central darkened region. A continuous layer 72 of non-alloyed aluminum remains intact at the joint, sealing the joint and preventing corrosive agents from attacking and creating corrosion at the joint. This welding method may be effective, for example, for preventing moisture trapped between the workpieces from contacting and causing corrosion of the welded joint.

From the foregoing description of certain preferred embodiments of the invention, it will be appreciated that the invention provides unique friction welding methods and welded joints. The methods of the invention create welded butt joints in which corrosion-resistant material 26 metallurgically bonds to portions of the workpieces 10 and 12 in the weld zone 22, and creates welded lap joints in which corrosion-resistant material 56 metallurgically bonds to a portion of an upper workpiece 50 in the weld zone 60, and/or in which corrosion-resistant material 68 metallurgically bonds to and surrounds a weld zone 70 at a lap joint. The corrosion-resistant material 26, 56, or 68 protects the metal in the weld zone which has been metallurgically altered during the welding operation and is otherwise susceptible to corrosion.

While the invention has been explained by reference to certain preferred embodiments thereof, it is to be understood that the invention is not limited to the particular details of these embodiments, and various modifications and substitutions of equivalents may be made thereto without departing from the scope of the invention as defined in the appended claims.

What is claimed is:

1. A method of friction stir welding two metal workpieces together along a joint therebetween such that the joint has a metallurgically bonded layer of corrosion-resistant material covering an outer surface of the joint, the method comprising:

positioning the workpieces in contact with each other to define a joint therebetween along which the workpieces are to be welded together;

defining a weld zone spanning the joint between the workpieces which is to rendered plastic for creating a metallurgical bond between the workpieces along the joint, the weld zone having an outer surface;

covering the outer surface of the weld zone with a layer of corrosion-resistant material; and friction stir welding the workpieces together along the joint so as to plasticize the metal in the weld zone, and to cause plastic flow of the corrosion-resistant material along the outer surface of the weld zone and metallurgical bonding of the corrosion-resistant material with a portion of the plasticized metal so as to create a corrosion-resistant material covering the outer surface of the joint.

2. The method of claim 1 wherein the step of positioning the workpieces comprises positioning the workpieces in edge-abutting relation to define a butt joint therebetween, wherein the weld zone is comprised of abutting portions of both workpieces such that the outer surface of the weld zone comprises outer surfaces of both workpieces on opposite sides of the joint, and wherein the step of covering the outer surface of the weld zone comprises covering outer surfaces of both workpieces to cover the weld zone.

3. The method of claim 2 wherein the step of covering the outer surface of the weld zone comprises applying a single continuous corrosion-resistant material layer over the outer surfaces of the workpieces spanning the joint.

4. The method of claim 3 wherein the step of covering the outer surface of the weld zone comprises tack welding a strip of corrosion-resistant metal to the workpieces so as to cover the weld zone.

5. The method of claim 2 wherein the step of covering the outer surface of the weld zone comprises applying a discrete corrosion-resistant material layer over the outer surface of each workpiece covering the weld zone thereof such that the discrete corrosion-resistant material layers cooperate to define a substantially continuous layer covering the weld zone when the workpieces are placed in edge-abutting relation.

6. The method of claim 5 wherein the step of applying a discrete corrosion-resistant material layer to each workpiece comprises cladding the outer surface of each workpiece with a corrosion-resistant material layer.

7. The method of claim 2 wherein the step of friction stir welding comprises engaging both workpieces on either side of the joint with a stir pin of a rotating friction stir welding tool so as to cause local plasticization of the metal of both workpieces adjacent the joint, and advancing the rotating friction stir welding tool along the joint to create the friction stir welded joint.

8. The method of claim 7 wherein the step of friction stir welding further comprises engaging the corrosion-resistant material layers with a shoulder of the rotating friction stir welding tool, the shoulder frictionally engaging the corrosion-resistant material layers in shear to cause plastic flow thereof and metallurgical bonding of the corrosion-resistant material with the workpieces.

9. The method of claim 1 wherein the step of positioning the workpieces comprises positioning the workpieces in overlapping relation to define a lap joint therebetween, the weld zone extending completely through the thickness of a first of the workpieces from an outer surface thereof and partially through the thickness of a second of the workpieces, and wherein the step of covering the outer surface of the weld zone comprises applying a corrosion-resistant material layer over the outer surface of the first workpiece to cover the weld zone.

10. The method of claim 9 wherein the step of covering the outer surface of the first workpiece comprises tack welding a strip of corrosion-resistant metal to the outer surface of the first workpiece to cover the weld zone.

11. The method of claim 9 wherein the step of applying a corrosion-resistant material layer over the outer surface of the first workpiece comprises cladding the outer surface of the first workpiece with corrosion-resistant metal.

12. The method of claim 9 wherein the step of friction stir welding comprises plunging a stir pin of a rotating friction stir welding tool into the workpieces such that the stir pin extends from the outer surface of the first workpiece through the thickness thereof and partially through the thickness of the second workpiece, and advancing the rotating friction stir welding tool along a path through the workpieces to create the friction welded joint.

13. The method of claim 12 wherein the step of friction stir welding further comprises engaging the corrosion-resistant material layer with a shoulder of the rotating friction stir welding tool, and frictionally heating and shearing the corrosion-resistant material layer by frictional engagement of the shoulder therewith.

14. A method of friction stir welding two metal workpieces together along a lap joint therebetween such that the joint has a metallurgically bonded layer of corrosion-resistant material surrounding the joint, the method comprising:

positioning the workpieces in overlapping relation with each other and interposing a layer of corrosion-resistant material between overlapping portions of the workpieces to form a lap joint along which the workpieces are to be welded together; and friction stir welding the workpieces together along the joint so as to plasticize the metal in the weld zone and in the corrosion-resistant material layer, the corrosion-resistant material layer metallurgically bonding with a portion of the plasticized metal so as to create a zone of corrosion-resistant material surrounding the weld zone at the lap joint.

15. The method of claim 14 wherein the steps of positioning the workpieces and interposing a corrosion-resistant material layer therebetween comprises cladding the corrosion-resistant material layer onto a surface of one of the workpieces, and positioning said one of the workpieces in overlapping relation with the other workpiece with the corrosion-resistant material layer in contact with the other workpiece.

* * * * *